United States Patent [19]
Wreathall

[11] 3,761,615

[45] Sept. 25, 1973

[54] TEMPERATURE IMAGE CAMERA WITH MEANS FOR MOVING THE IMAGE IN THE IMAGE PLANE

[75] Inventor: William Michael Wreathall, Writtle, Essex, Chelmsford, England

[73] Assignee: English Electric Valve Company Limited, Essex, England

[22] Filed: Feb. 3, 1972

[21] Appl. No.: 223,109

[30] Foreign Application Priority Data

Mar. 19, 1971 Great Britain .................... 7,384/71

[52] U.S. Cl. ............ 178/7.2, 178/7.92, 178/DIG. 8
[51] Int. Cl. ............................................ H04n 5/30
[58] Field of Search .................. 178/7.2, 7.85, 7.92, 178/DIG. 8

[56] References Cited

UNITED STATES PATENTS

| | | | |
|---|---|---|---|
| 2,881,248 | 4/1959 | Wilner | 178/7.2 |
| 3,646,267 | 2/1972 | Tompsett | 178/7.2 |
| 2,971,116 | 2/1961 | Bendell | 178/7.2 |
| 2,953,710 | 9/1960 | Dewitt | 178/7.2 |

*Primary Examiner*—Robert L. Richardson
*Attorney*—Donald W. Wight et al.

[57] ABSTRACT

The image of an object is focussed onto the pyroelectric target of a camera tube by a lens whose axis is continously rotated about the axis of the tube by rotating eccentric lens mounting arrangement. To compensate for the resultant movement of the image in the plane of the target, compensating voltages are derived from a resolver rotated in synchronism with the lens axis rotation and are superimposed on the line and field scanning voltage waveforms so that there is no relative movement between the image and the scanning raster.

8 Claims, 4 Drawing Figures

TEMPERATURE IMAGE CAMERA WITH MEANS FOR MOVING THE IMAGE IN THE IMAGE PLANE

This invention relates to television and like cameras. In a present day television or like camera an image of a subject of transmission is projected on to the target of a camera tube (in a colour television camera there is a plurality of tubes with an image projected on to the target of each tube) and is scanned by an electron beam to develop picture signals for utilisation. However, with certain forms of target an output signal is obtained from a given point in the target only in response to a change in the corresponding point in the image projected on the target. This occurs in the case of a television camera having a camera tube of which the target employs a so-called pyro-electric material. Such cameras are capable of translating heat images — hereinafter referred to as "temperature images" — of a subject of transmission into picture signals. Pyro-electric materials are electrically sensitive to temperature and if a body of pyro-electric material is subjected to temperature changes, changes in the internal polarisation of the material are produced and, resulting from these, changes in the electrical charge conditions at the surface of the body occur. If therefore, a thin slice of pyro-electric crystal has a temperature image focussed thereon, there will be produced across its surface an electrical charge image which corresponds with the original temperature image and will hereinafter be termed "a voltage distribution image." By scanning the voltage distribution image by a cathode ray in such manner as to read it off picture signals can be obtained but, as will be seen, the production of output signals requires that there shall be changes in the potentials of the different points in the voltage distribution image. If, therefore, the temperature image is a constant, unchanging one, and it is scanned in the ordinary known way by a scanning electron beam the requirement just mentioned will not be satisfied. The known way of overcoming this difficulty is to interrupt or "chop" the heat paths to the pyro-electric material at a suitable frequency. However, such interruption of heat paths is difficult to achieve satisfactorily and is objectionable for a variety of practical reasons. The present invention relates to television or like cameras of the kind in which picture signals are developed by means of a camera tube having a target which is such that changes in an image projected on the target are necessary in order that picture signals may be developed when the target is scanned by an electron beam. The object of the invention is to provide improved cameras of this kind which will produce picture signals without having to interrupt or chop the paths over which the said image is projected on to the said target.

According to a feature of this invention a television or like camera of the kind referred to comprises means for continuously producing relative movement in the plane of the target of the camera tube between the image projected thereon and the target itself.

According to another feature of this invention a television camera adapted to produce picture signals from a temperature image of a subject of transmission and comprising a camera tube having a target employing pyro-electric material includes means for continuously producing relative movement in the plane of the target between the temperature image projected thereon and the target itself.

The relative movement of the image need only be quite small. It can be reciprocating movement or movement in repeated small steps or it may be more or less random movement. Preferably, however, it is continuous movement along a closed path. The effect of the relative movement is to change, in succeeding instants of time, the point of the temperature image which is for the moment on a given point of the target. In this way picture signal production is obtained without having to interrupt or chop the paths over which the temperature image is projected on to the target. Theoretically the relative movement can be obtained either by moving the image which is projected on to the target, or by moving the target itself in its own plane or by a combination of both. However, as will be apparent, procuring the relative movement by moving the image alone (by movement imparted to some part of the optical system by which it is projected on to the target) has the important practical advantage that it does not involve the mechanical difficulties and cost inherent in having a mechanically moving member (the target) inside the envelope of the camera tube.

If the target is fixed and relative movement between the projected image and the target is achieved by moving the former in the plane of the latter the result will also be to produce relative movement between the image and the raster which scans it, although, if it is only the target which is moved, the image and the raster will be fixed in relation to one another. In the former case — fixed target and moving image — if the relative movement between raster and image is small enough it may be tolerable in some television applications — for example in a television indicator display of simple printed information — but in many cases, probably in the majority of cases, it will not be. In such cases, therefore, the scanning raster is preferably also moved in the plane of the target at least approximately in correspondence with the movement of the image on the target and synchronously therewith, so that, by reason of this corresponding movement of the raster, the relative movement of the raster to the image is made zero or approximately so.

There are numerous different ways in which relative movement of the projecting image in the plane of the target can be accomplished. One simple way is to mount an imaging lens by means of which the image is projected on to the target eccentrically in a bearing the axis of which is coincident with the tube (and its target) axis and continuously to rotate the lens in its bearings.

A preferred way of obtaining compensating movement of the raster is to resolve the movements of the image into mutually perpendicular compensating components and to superimpose these on the normally provided mutually perpendicular components of scanning deflection of the tube. If required, means may be provided for adjusting the coefficients of proportionality of the compensating components in order to achieve a high degree of compensating over a practically wide range of focussing adjustment of the optical system by means of which the projected image is projected on the target so that good compensation is obtained not only when said optical system focussing is set at infinity but also when it is adjusted to focus on near objects. Such adjustment of the coefficients of proportionality may conveniently be ganged with the normally provided means for adjusting focussing.

The invention is illustrated in the accompanying drawings in which

Figure 1:
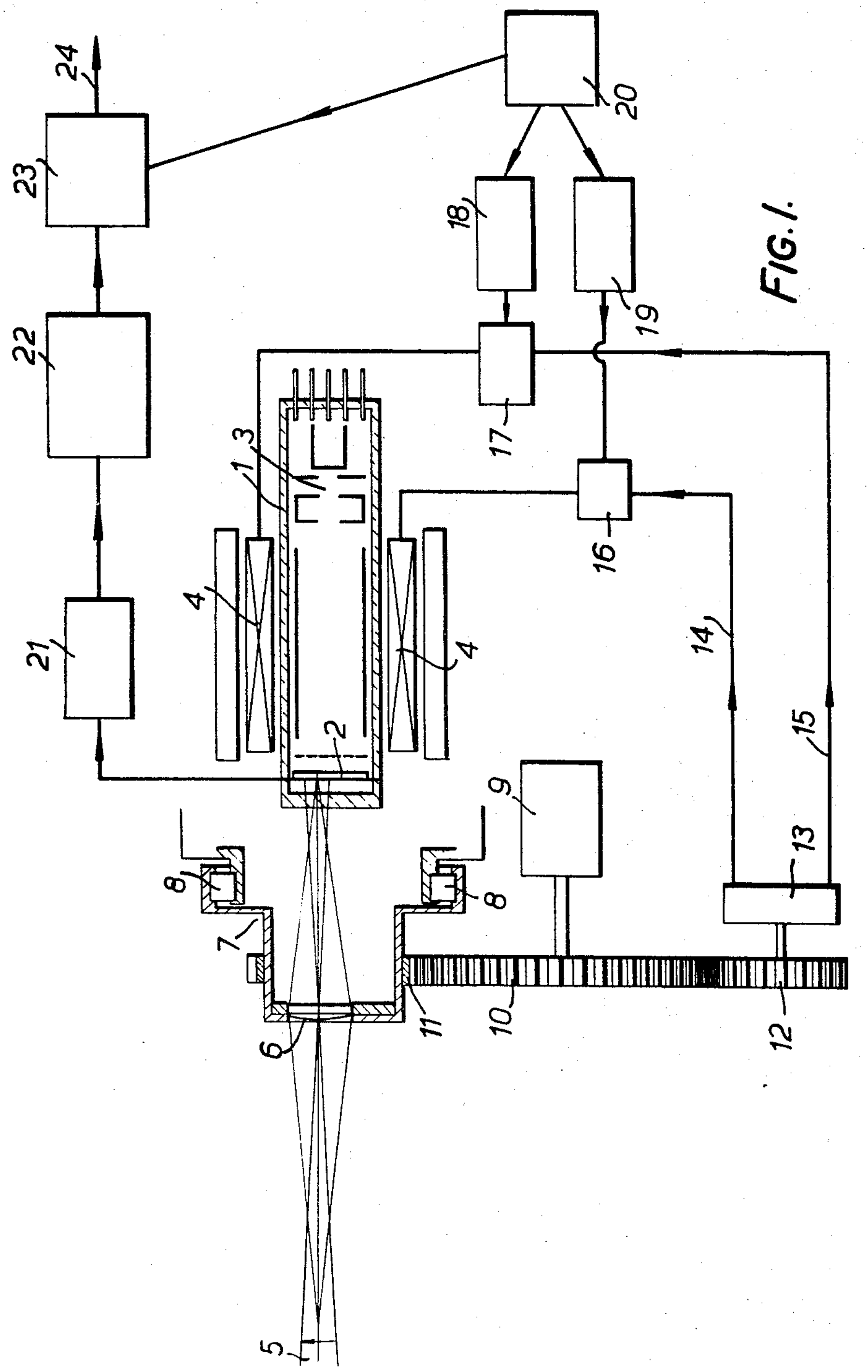
FIG. 1 is a schematic representation of one embodiment.

Referring to FIG. 1, this shows in simplified diagrammatic manner a camera tube 1 which is as known per se and has a target 2 the active material of which is pyro-electric material. A voltage distribution image produced on this target is scanned by a scanning electron beam from an electron gun system 3. Scanning deflection is produced by mutually perpendicular deflection coils incorporated in a deflection coil system 4. A temperature image of a subject of transmission, represented by the arrow 5 is focussed on the target 2 by an imaging lens 6. This lens is mounted in a mounting 7 which is rotatable with respect to the main body of the camera housing, e.g. by a roller bearing 8. The axis of the lens 6 is parallel to but slightly displaced laterally with respect to the common axis of the tube 1 and of its target, so that the lens is eccentrically mounted and when the mounting 7 is rotated in its bearing a temperature image projected on to the target will move in the plane of the target in a small diameter closed path. Rotation is provided by an electric motor 9 driving a gear wheel 10 which engages with a ring gear 11 on the mounting 7.

A further gear 12, meshing with the gear 10 drives a resolver 13 of any convenient known form, e.g. of the potentiometer type which is arranged to produce compensating voltage components proportional respectively to the mutually perpendicular components of the movement (brought about by the rotation of the housing 7) of the temperature image with respect to and in the plane of the target. Each of these compensating voltage components appears on one or other of the leads 14 and 15 and the said compensating voltage components are applied to combining or superimposing networks 16 and 17, where they are superimposed on line scanning and field scanning voltages provided, in any convenient well known way, by line and field scanning generators 18 and 19 driven by a master pulse generator 20. The resultants of the combinations effected at 16 and 17 are applied to the line and field deflecting coils in the coil system 4, the arrangement being such that the electron beam from the gun 3 scans the temperature image on the target 2 at the same time following its movements (caused by rotation of the housing 7) in the plane of and with respect to said target.

It will be seen that, with the apparatus as so far described, the movement of the scanning raster with respect to and in the plane of the target can provide exact compensation for the movement of the temperature image with respect to and in the plane of the target only when the lens 6 is focussed at infinity. When the lens is adjusted to focus on near objects (although, for convenience in drawing, the lens is represented without focussing adjustment, an adjustable focussing lens is assumed), compensation will be incomplete. Substantially complete compensation can, if desired, be obtained by providing adjustable means (not shown) for adjusting the coefficients of proportionality of the compensating voltages appearing on leads 14 and 15. Such adjusting means could be constituted by, for example, suitable adjustable potentiometers inserted in the leads 14 and 15. Preferably the adjustment of said means is ganged with the normally provided adjustment (not shown) of focussing of the lens 6.

The signal output arrangements of the tube 1 may take any suitable known form. As indicated, output signals are fed to a head amplifier 21, followed by the usual video signal processing circuits represented by block 22, in turn followed by the customary blanking and synchronising circuits represented by block 23 and the resulting composite video signals are taken off for transmission or other utilisation by lead 24.

Figure 2:
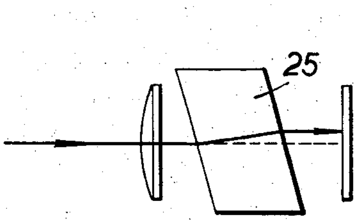
FIGS. 2, 3 and 4 show diagrammatically and sufficiently for an understanding thereof, three others of the many different ways in which image movement in the plane of the target can be obtained.
Figure 3:
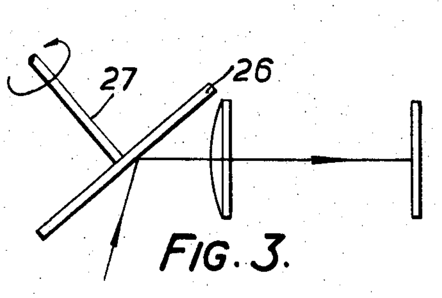
Figure 4:
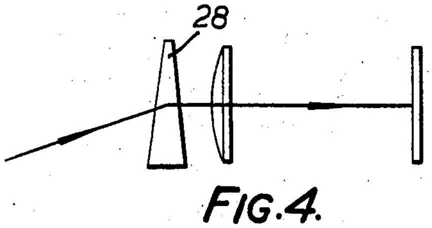

The illustrated embodiment shows only one of many ways in which the invention can be carried into effect and many variants are possible within the scope of the invention, especially as regards the means for moving the image projected on to the target in the plane thereof and the means for imparting compensating movement to the scanning raster so that the latter is made stationary, or approximately so, with respect to the image it scans. For example, instead of using an eccentrically mounted rotating lens to project an image on to the target, a rotating glass block 25 of parallelogram form with inclined entry and leaving faces could be used as indicated in simplified schematic manner in FIG. 2, or a rotating mirror 26 which is a little out of the perpendicular to its axis 27 of rotation could be employed as similarly indicated in FIG. 3, or use could be made of an inclined rotating prism 28 as similarly indicated in FIG. 4.

As will now be seen, in all the illustrated embodiments of the invention, it is only the image projected on to the target that is moved, the target itself being fixed in the camera tube. The tube itself may therefore be as known per se. This, however, is not theoretically essential and it is possible to carry the invention into effect by moving the target in its own plane instead of, or as well as, moving the image. Thus, for example, the target could be supported within the tube envelope by a spring support, e.g. a hair spring, permitting movement of small amplitude and such movement could be obtained by applying an alternating magnetic or electric field from outside the tube envelope to produce oscillations of a suitable armature member responsive to said field and mechanically coupled or attached to the target structure, e.g. the target could be supported by a spring made of magnetic material and subjected to an externally applied alternating magnetic field so that more or less random but sufficient movement of the target was thereby obtained. However, in the interests of constructional simplicity of the camera tube it is at present preferred to use a stationary target and a moving image. If, however, the image is stationary and the target is moved there is the advantage that there is no question of providing for compensating movement of the raster because, of course, the raster and the image are in fixed relationship to one another.

I claim:

1. A television or like camera comprising, in combination:

target means and scanning means for producing an output signal from any given point in the target means only in response to a change in the corresponding point in an image projected on the target means, whereby no output signals are produced for images of stationary scenes;

lens means for continuously projecting images on said target means; and means for continuously producing relative movement in the plane of said target means between images projected thereon and said target means, whereby output signals are produced from stationary images viewed by the camera.

2. A camera as defined in claim 1 wherein said target means is formed of pyro-electric material.

3. A camera as claimed in claim 1 and wherein the relative movement of the image is continuous movement along a closed path.

4. A camera as claimed in claim 1 and wherein the relative movement of said image is arranged to be procured by movement of the image alone.

5. A camera as claimed in claim 4 and wherein means are provided for moving the scanning raster in the plane of the target at least approximately in correspondence with the movement of the image on the target and synchronously therewith, so that, by reason of this corresponding movement of the raster, the relative movement of the raster to the image is made zero or approximately so.

6. A camera as claimed in claim 5 and wherein the means for obtaining compensating movement of the raster includes means for resolving the movements of the image into mutual perpendicular compensated components and to superimpose these on the normally provided mutually perpendicular components of scanning deflection of the tube.

7. A camera as claimed in claim 6 and wherein means are provided for adjusting the coefficients of proportionality of the compensating components in order to achieve a high degree of compensation over a practically wide range of focussing adjustment of the optical system by means of which the projected image is projected on the target so that good compensation is obtained not only when said optical system focussing is set at infinity but also when it is adjusted to focus on near objects.

8. A tube as claimed in claim 7 and wherein means are provided for ganging the coefficients of proportionality with the normally provided means for adjusting focussing.

* * * * *